United States Patent [19]

Soodalter

[11] 4,205,570
[45] Jun. 3, 1980

[54] MEAT CUBING APPARATUS

[76] Inventor: Arnold Soodalter, University Park Apts., Apt. M-1, Holyoke, Mass. 01040

[21] Appl. No.: 972,225

[22] Filed: Dec. 22, 1978

[51] Int. Cl.² .............................................. B26D 3/18
[52] U.S. Cl. .................................... 83/404.2; 83/500; 83/425.3; 83/408
[58] Field of Search ...................... 83/404.2, 500, 885, 83/884, 408, 425.1, 425.3

[56] References Cited

U.S. PATENT DOCUMENTS

| 1,239,926 | 9/1917 | Luer | 83/500 |
| 1,422,901 | 7/1922 | Terry | 83/500 |
| 3,990,336 | 11/1976 | Soodalter | 83/404.2 |
| 4,046,042 | 9/1977 | Payeur | 83/500 |

FOREIGN PATENT DOCUMENTS 202027  2/1959  Austria ..................................... 83/500

*Primary Examiner*—Donald R. Schran
*Attorney, Agent, or Firm*—Ross, Ross & Flavin

[57] ABSTRACT

In unitary meat cubing apparatus providing a first cutting means for cutting a slab from the work and a second cutting means for cutting the so-severed slab into longitudinally extending strips and a third cutting means in right angular disposition to the first and second cutting means for cutting the so-severed strips into cubes, plural improvements are provided at the first cutting stage in the form of horizontally-disposed contra-rotating cutters, at the first and second cutting stages in the form of means for conveying the work forwardly in a two-phase movement with a first phase allowing the movement unisonly of an interengaged hopper and primary ram and a second phase allowing the stoppage of further forward movement of the hopper following the severing action at the first cutting means and the disengagement of the primary ram therefrom for its continued movement into and through the operating zone of the second cutting means, and at the junction of the second and third cutting stages in the form of insuring the successful transfer of the work from the former to the latter (a) by the dropping of the work from the plane of the work zone in the second cutting stage to a lower work zone plane in the third cutting stage and (b) by the urging of the primary ram rearwardly through the camming action of the tertiary ram for clearing the work from the second cutting stage before movement forwardly in the third cutting stage.

2 Claims, 11 Drawing Figures

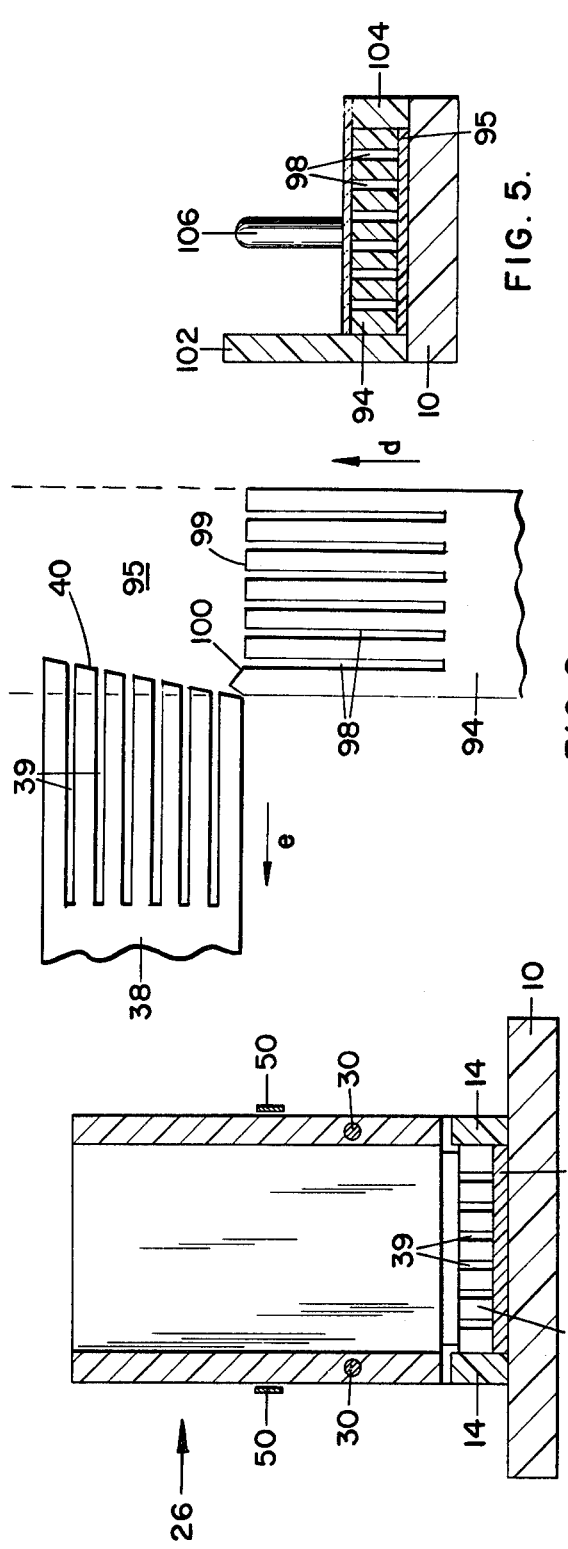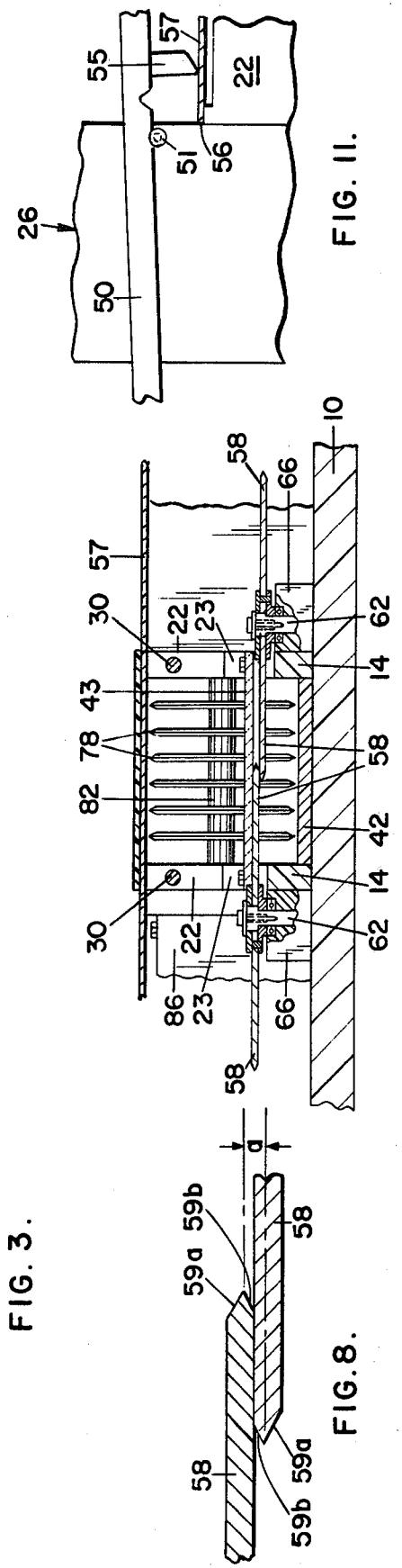

MEAT CUBING APPARATUS

The invention relates to a simple and efficient unitary construction in a meat cubing apparatus, which may be readily completely disassembled for cleaning purposes. The improvements over the art are provided: (1) at the first cutting stage in the form of horizontally-disposed contra-rotating cutters, (2) at the first and second cutting stages in the form of means for conveying the work forwardly in a two-phase movement with a first phase allowing the movement unisonly of an interengaged hopper and primary ram and a second phase allowing the stoppage of further forward movement of the hopper following the severing action at the first cutting means and the disengagement of the primary ram therefrom for its continued movement into and through the operating zone of the second cutting means, and (3) at the junction of the second and third cutting stages in the form of insuring the successful transfer of the work from the former to the latter (a) by the dropping of the work from the plane of the work zone in the second cutting stage to a lower work zone plane in the third cutting stage and (b) by the urging of the primary ram rearwardly through the camming action of the tertiary ram for clearing the work from the second cutting stage before movement forwardly in the third cutting stage.

PRIOR ART

The prior art of which I am aware includes my own two earlier U.S. Pat. Nos. 3,990,336 of Nov. 9, 1976 and 4,031,789 of June 28, 1977, as well as the following U.S. Pat. Nos.:

1,726,356 of Aug. 27, 1929
1,919,964 of July 25, 1933
2,161,891 of June 13, 1939
2,279,071 of Apr. 7, 1942
3,841,186 of Oct. 15, 1974

The feature of disposing banks of knives in right angular relationship as to each other for the in seriatim cutting of a work into strips and cutting the strips into cubes is acknowledged to be old but is not herein claimed per se. Only my own two earlier patents teach the system of slabbing, stripping and cubing within a unitary construction but this too is not herein claimed per se. What is claimed are the features (1)-(3) outlined immediately above.

Figure 2:
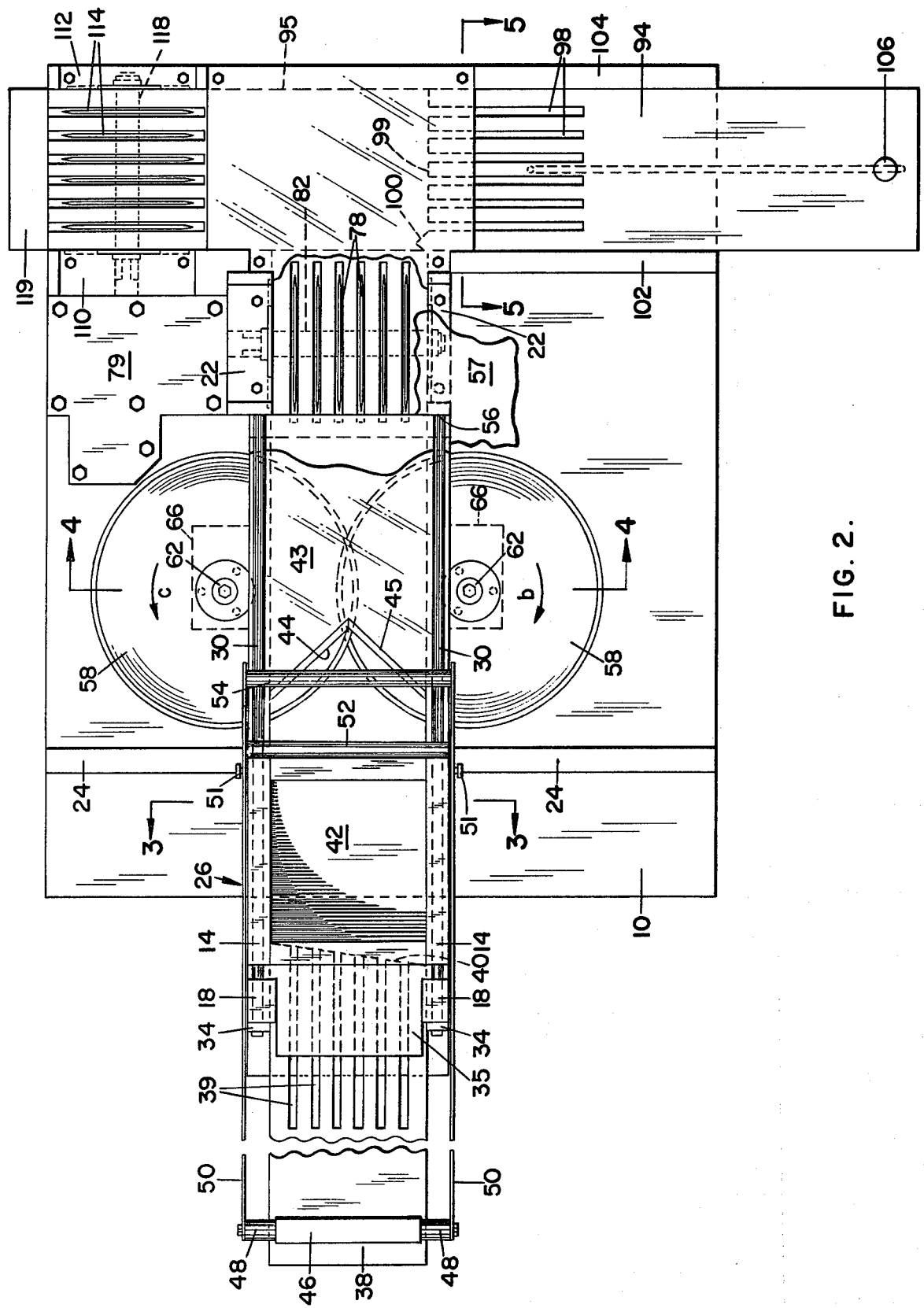
FIG. 2 is a view in top plan.
Figure 10:
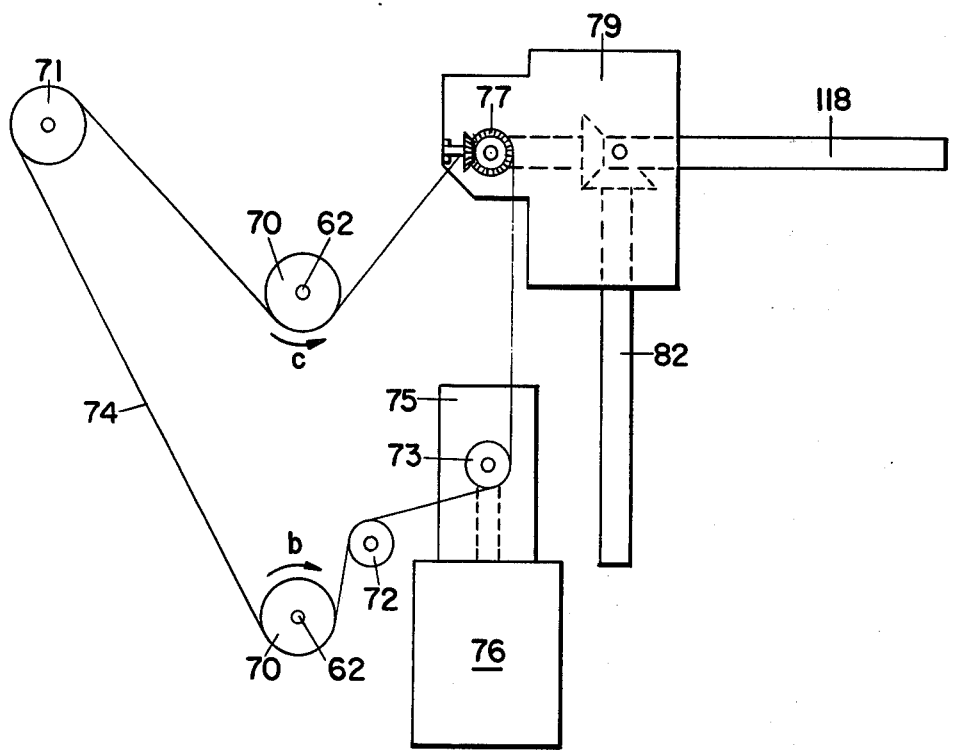
Figure 6:
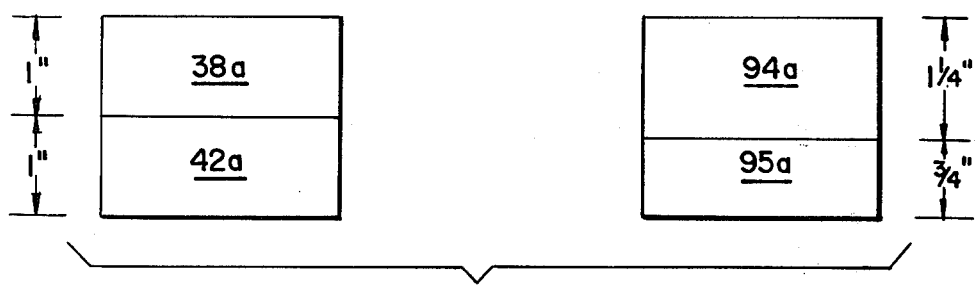
Figure 7:
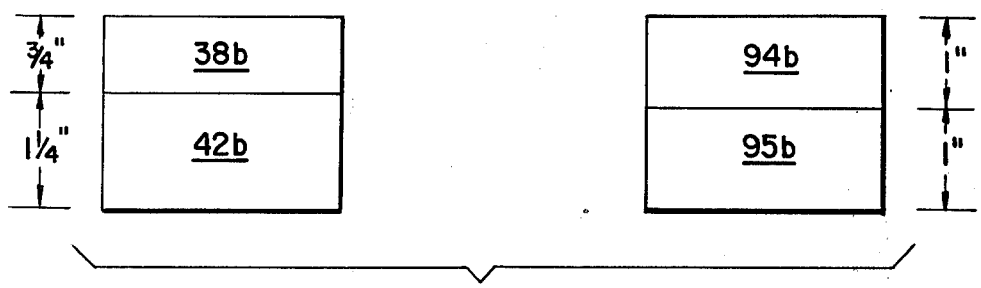

FIGS. 3, 4 and 5 are sectional views on the lines 3—3, 4—4 and 5—5 respectively of FIG. 2;

FIGS. 6 and 7 are schematic representations showing in each instance, a primary ram and its cooperant primary compensator and its related tertiary ram and its cooperant tertiary compensator for purposes of illustrating the interchangeability feature of the machine for adaptation to the cubing of meat of varying predetermined thicknesses;

FIG. 8 is a greatly enlarged fragmentary view in section showing the relationship of the peripheral edges of the slabbing cutters;

FIG. 9 is a fragmentary view in top plan showing the camming relationship of the primary and tertiary rams at their juncture;

FIG. 10 is a greatly simplified schematic view showing the drive system of the apparatus; and FIG. 11 is a fragmented view showing the camming action of the protective cover upon one of the arms of the apparatus.

Figure 1:
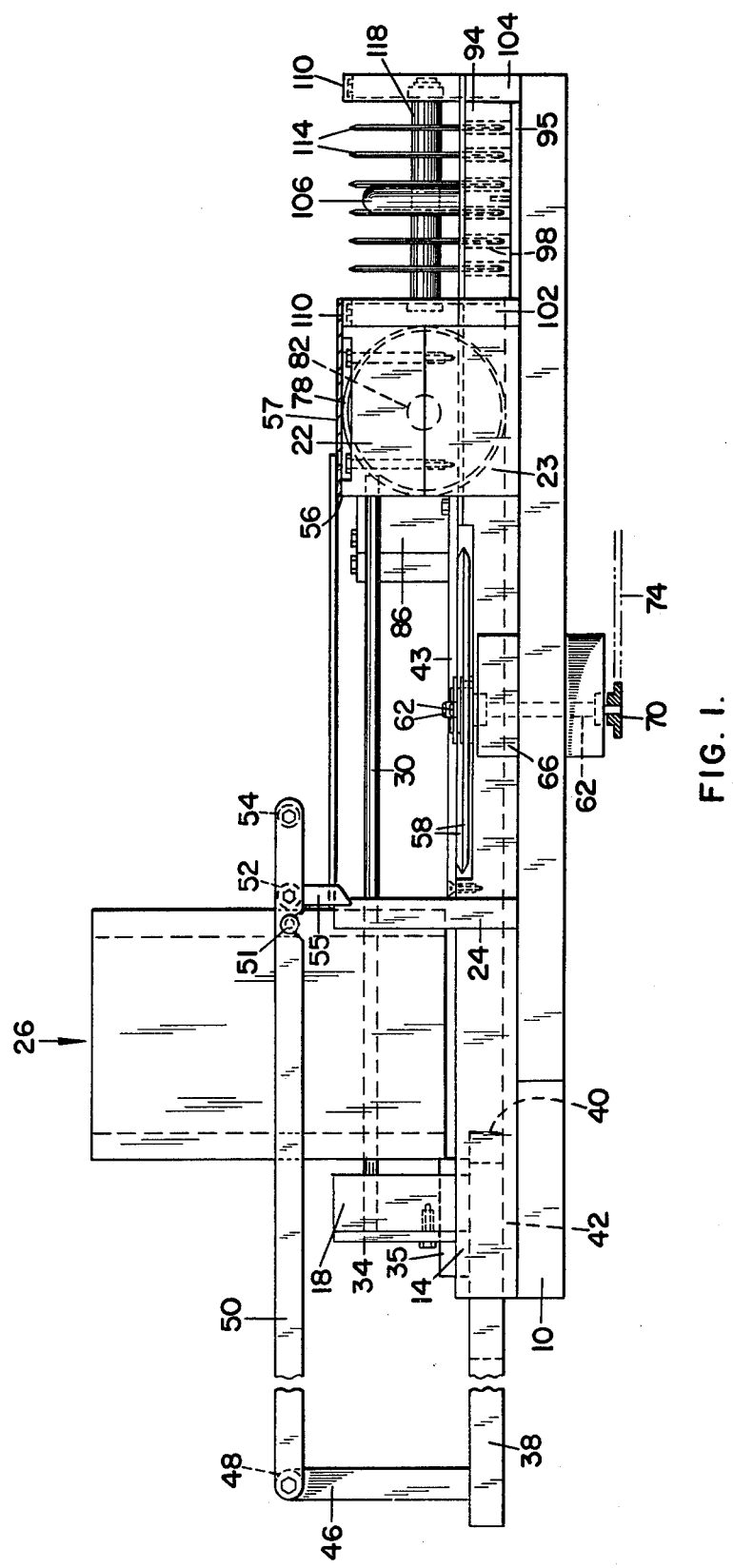
FIG. 1 is a view in front elevation of a meat cubing machine embodying the invention.

The apparatus, as best viewed in FIG. 1, will be understood to be mounted upon a base 10 desirably supported upwardly of a flooring by a table or bench, not shown.

The base 10 fixedly supports a pair of spaced opposite and parallel guides 14 extending longitudinally from aft (leftward in FIG. 1) toward fore (rightward in FIG. 1) through a major portion of the apparatus length and defining therebetween a workway extending longitudinally and centrally of the base.

Adjacent the aft end of each guide 14 a rod guide 18 is vertically disposed relative to and removably secured to the guide and adjacent the fore end of each guide 14 an upper secondary cutter support 22 and a lower secondary cutter support 23 are vertically disposed in stacked relation upon the base 10. Lower support 23 is suitably secured to the base 10 and upper support 22 is suitably secured to the lower support. These components extend longitudinally in axial alignment, with one set disposed at the front as viewed in FIG. 1, and one set at the rear and will be understood to be readily separable for the all important desideratum of easy and frequent cleaning.

An upstanding side wall 24, broken at its midsection for the extending therethrough of the guides 14, is fixedly mounted on the base 10.

A hopper 26 is supported upwardly of the guides 14 and is comprised of vertically-extending opposite front and rear and opposite side walls to define a vertically-extending feeding chute open at its upper and lower ends and which is reciprocable longitudinally along and relative to spaced hopper support rods 30 in alternating forward and retrograde movements, each hopper support rod being extendable through provided aligned openings in the respective rod guide 18 and the respective front or rear hopper wall and having a forward terminus receivable in a provided aft-facing recess in the respective upper secondary cutter support 22 and having a rearward terminus within the respective rod guide closed off by a respective rod anchor 34 in the form of a plate which is removably secured to the respective rod guide 18 in suitable manner. Quick disengagement of a rod anchor from its related rod guide allows ready withdrawal of the hopper support rod for cleaning purposes.

A tertiary stop 35 is fixed to the rear wall of hopper 26 and is adapted to engage rod guides 18 to define the rearward or retracted position of the hopper as shown in FIG. 1.

A primary ram 38 extends horizontally between and is slidable relative to the guides 14 and upon and relative to a removable primary compensator 42 seated upon the base 10 between the guides, further reference to the removability being made hereinafter.

The primary ram 38 is provided with a plurality of spaced, forwardly-facing, rearwardly-extending slots 39 commencing at the ram's forward end face 40 to allow for the passage of the forward part of the ram through a bank of spaced, vertically-disposed secondary cutting knives 78, to be described, as the ram is urged forwardly to forwardmost operational position, each slot serving to accept one of the knives of the bank thereof.

Further as to the forward end face 40, it is to be observed that the face is angularized slightly rearwardly from rear to front sides for purpose to be referred to.

An upstanding abutment 46 is fixed to the rear end of the primary ram 38 and supports in a provided opening a transversely-extending shaft 48 which pivotally mounts a pair of spaced opposite horizontally-extending arms 50 vertically disposed above the spaced opposite guides 14, one such arm being disposed adjacent the hopper front wall and one being disposed adjacent the hopper rear wall, and each extending slightly therebeyond in forward direction.

The arms 50 are suitably notched to allow the releasable seating thereof upon respective outwardly-projecting pins 51 strategically located on each of the front and rear hopper walls, thereby defining a first stop means when the hopper and primary ram are in their respective rearwardmost FIG. 1 positions, in which positions work from within the hopper is free to gravity feed downwardly and out of the lower open end of the hopper to a first work zone therebelow as defined by the primary compensator 42 at the bottom, the guides 14 at the front and rear sides and the forward end face 40 of the primary ram 38 at the rearward side.

A transversely-extending stop 52 extends between and is fixed to the opposite arms 50 to define a second stop means in the rearwardmost FIG. 1 position by virtue of the embracement of the stop 52 against the forwardly-facing hopper side wall and a manually engageable handle 54 extends transversely between and is fixed to the opposite arms 50 forwardly of the stop 52.

A cam follower 55 extends downwardly from each arm 50 forwardly of the respective notch for achieving a unison lifting of the arms upwardly upon their pivot 48 as the arms and the hopper 26, interengaged therewith, are manually pulled forwardly by the handle 54. At a predetermined point in this forward travel, the forwardly-facing hopper side wall abuts the rearwardly-facing side walls of the respective upper and lower secondary cutter supports 22 and 23 for the preclusion of further forward movement, thus defining a fourth stop means, and whereat a continued forward pulling by the operator causes the cam followers 55 to ride upwardly upon the rearwardly-facing edge or end face 56 of a protective cover plate 57, shown fragmentarily in FIG. 1, the edge or end face defining a cam for the pair of cam followers resulting in the lifting of the arms 50 out of their respective notches, thereby achieving disengagement of the arms from the hopper and accommodating to continuance of the forward rectilinear movement of the primary ram 38.

Supported upwardly in spaced relationship and extending through the base 10 and astride the workway, so far defined by the guides 14, primary compensator 42, and primary ram 38, are a pair of vertically-extending primary cutter drive shafts 62, each suitably journalled in a respective pillow block 66 extendable through the base 10 and each mounting at its upper extremity in conventional manner a horizontally-disposed primary cutter 58.

The lowermost extremity of each drive shaft 62 mounts a sprocket 70 around each of which a drive chain 74 is entrained in manner to allow the driving thereof in opposite directions.

The primary cutters 58 take the form of generally flat members of equal diameter having work-contacting peripheries, and are of such design as to permit ready interchangeability, one with the other, in contemplation of avoidance of any confusion on the part of the operator.

The vertical axes of the primary cutters are spaced apart a distance less than the sum of the respective radii, see FIG. 2, so that their radial planes are of necessity disposed one above the other to accommodate to the resultant overlap, with either primary cutter serving as the upper component and either serving as the lower component in any assemblage, they being completely interchangeable, as aforementioned.

As best shown in FIG. 8, each primary cutter 58 has an outboard long peripheral bevel 59a and an inboard short peripheral bevel 59b, thus allowing the definition of a vertical space between the two outermost peripheries having a dimension denoted by a.

That is, the peripheral edges of the two primary cutters, each defined at the apex of the respective long and short bevel, are vertically spaced as to each other by the dimension denoted by a so that, in essence, the cutters define two cutting zones in the path of the moving work, with the cutting planes being parallel to each other and to the path of the moving work for achievement of a constant cutting contact with the work, "constant" being employed in the sense that cutting ensues in the two spaced apart planes so long as the cutters operate rotationally, in counter direction, as to each other and the work is moved theretoward and therepast.

The primary cutters are contra-rotating, as indicated by arrows b and c in FIGS. 2 and 10 through a chain drive to offer, at the point of initial confluence of the peripheral edges, a biting grasp of the work advanced thereto, additional to the inherent cutting force so that a positive traction is exerted on the work to aid significantly in its movement through the cutting area.

As the hopper 26 is manually pulled by the operator from rearwardmost FIG. 1 position to its aforementioned forwardmost position, as determined by the fourth stop means, embodied in the secondary cutter supports 22 and 23, the hopper is moved along and relative to the hopper support rods 30, the interconnected primary ram 38 moving concomitantly therewith, as aforesaid, and with that work portion which has dropped downwardly into the work area likewise moving therewith so that the work portion is progressively subjected to the cutting force of the primary cutters 58 resultant in a severance of work portion from work to define an eventually freed slab, with the so-severed slab passing forwardly below the cutters and the hopper and its contained work passing forwardly above the cutters.

A horizontally-disposed seal 43, formed of clear plastic to facilitate viewing, is disposed over that portion of the operating area defined between the guides 14 and immediately above the primary cutters 58 with a provided rearwardly-facing Vee notch or cut out 44 at its aft end, the notch-defining walls being beveled as at 45 to allow for a gradual sealing off of the lower open end of the hopper immediately the work is drawn past the confluence of the intersecting primary cutters whereat the cutting action has first ensued.

That is, as work slab is severed from work and both continue their forward movement, the practicality of sealing off the lower end of the hopper is obvious. Fail so to do would result in the contacting of more of the work with the upper planar surfaces of the primary cutters. The hopper accordingly is pulled over the seal and the work therein is sealed off from cutter contact.

As previously set forth, continued forward pulling of the hopper and primary ram brings the forwardly-facing hopper side wall into abutment with the upper secondary cutter supports 22 so as to preclude further forward movement of the now sealed-off hopper and the next-following disengagement of arms-from-hopper realizes a continued forward movement of the arms and primary ram causing the ram to push the so-severed slab through the second cutting means comprising a plurality of rotative vertically disposed secondary cutting knives 78 mounted in spaced relation upon a transversely-extending shaft 82 journalled in the opposite secondary cutter supports 22.

The slots 39 of the now advancing primary ram 38 allow clearance for the ram through the bank of secondary cutting knives in interdigitating manner wherefor the slab forwardly of the ram is pushed thereby while it is subjected to the cutting action of the secondary cutting knives and momentarily therefollowing.

Suffice to say that the area of the primary compensator 42 in the zone of the secondary cutting knives 78 is suitably slotted with a plurality of complemental spaced parallel vertically-extending slots to accommodate each of the secondary cutting knives and to permit passage of the full radial extent of each such knife to extend through the respective slot of the primary ram 38, and to insure the cutting through of the entirety of the work.

The continued forward movement of the primary ram thus forces the slab into the paths of the cutting knives 78 whereat same is severed into strips and to force the strips into what is defined as the tertiary work area normal to and in communication with the secondary work area.

When drawn forwardly to the full extent of its forward stroke, the primary ram 38 will be understood to assume a forwardmost position whereat the angularized forward end face will have extended slightly into a tertiary work area defined generally between transversely-extending inboard and outboard walls 102 and 104 fixedly mounted on and standing upwardly from base 10.

As will be observed, by reference to FIG. 9, this forwardmost primary ram position is such as to allow a jointure with a tertiary ram 94 slideably nested in the workway defined between the walls 102 and 104 and receivable upon a removable tertiary compensator 95.

Upwardly of each guide member 102 is provided a cutter support 110 which pair support therebetween a plurality of spaced, annular, rotatable cutting knives 114 having smooth, beveled knife edges and mounted on a shaft 118 extending transversely between and journalled in the cutter supports 110.

Pressure on the tertiary ram 94 forces the cut strips into the paths of the rotating cutting knives 114 to cut the strips into cubes as the knives are rotated.

The tertiary ram is provided with a manually engageable handle 106 to allow reciprocating movements thereof between a frontmost FIG. 2 position and a rearmost position to be later referred to, and is further provided with spaced slots 98 extending inwardly from its rearwardly facing end face 99.

The inboard edge of the end face 99 is provided with a projection 100 serving as a cam for contacting the angularized forward end face 40 of the primary ram. As the tertiary ram is motivated in front to rear direction, as denoted by arrow d in FIG. 9, the cam 100 will be understood to achieve increments of slight retrograde movements of the primary ram in the direction of arrow e.

The apparatus offers versatility in the respect that various thicknesses of primary and tertiary rams may be selectively employed to provide cubes of various thicknesses.

Reference is made to FIGS. 6 and 7 illustrating, schematically, two primary rams 38a and 38b, ram 38a having a thickness of say 1" with a compensating thickness of 1" in a primary compensator 42a to meet the overall height allowance in the work area of 2" and to provide an end product in the form of cubes having a thickness of 1".

In the event that cubes of a smaller thickness are desired, say ¾", then the primary ram and compensator may be replaced by a primary ram 38b having a thickness of ¾" and by a primary compensator 42b having a compensating thickness of 1¼" to meet the same overall height allowance in the work area of 2" and to provide the cubes having the desired ¾" thickness.

Still with reference to FIGS. 6 and 7, it is to be further explained that another feature of the invention lies in the disposition of the uppermost planar surface of the tertiary compensator 95 in a plane slightly below the plane of the uppermost planar surface of the primary compensator 42 so as to allow a slight droppage of the work as it is pushed by the primary ram onto the surface of the tertiary compensator.

This droppage is allowed by the forming of the tertiary compensator 95a with a height say of ¾" (in FIG. 6) so as to be less than the 1" height of primary compensator 42a, ergo the allowed droppage.

Further, this dictates an increase in the height of the cooperant tertiary ram 94a to a height of 1¼" so as to meet the overall height allowance in the work area of 2".

And, referring to FIG. 7, if the height of the replaced primary compensator 42b is 1¼", then the height of the tertiary compensator 95b can be raised to 1" and accordingly the height of the replaced tertiary ram 94b can be raised to 1" to meet the overall height allowance in the work area of 2". In the dropping of the work from the secondary zone to the tertiary zone, I have determined that the sizes of the pieces is in no way inhibited.

Continued pressure on tertiary ram 94 forces the cubes outwardly from the machine through a chute 119 provided adjacent cutting knives 114 into a suitable receptacle.

With reference to the schematic representation of the drive system in FIG. 10, the drive shafts 62 of the two primary cutters mount the sprockets 70 around which are entrained the drive chain 74, further entrained around an idler sprocket 71, a take up sprocket 72, a gear reduction box 75 intergeared in conventional manner with a prime mover 76, and a 4 way drive train sprocket 77 in a conventional 4-way drive train box 79 having gearing connections with secondary and tertiary cutter shafts 82 and 118 respectively through suitable bevel gearing of usual design.

While the device has been described as being semi-automated and using the manually movable primary and tertiary rams, it will be understood that those components may be fully automated.

I claim:

1. In meat cubing apparatus incorporating means for the seriatim cutting of slabs from meat and cutting the so-severed slabs into strips and cutting the so-severed strips into cubes, the improvement comprising:
- a horizontally-disposed work channel including a first linear path having inboard and outboard termini and a third linear path having inboard and outboard termini and disposed normal to and in communication with the first path,
- a hopper reciprocable relative to the first path between an inboard-meat-charging position and an outboard-meat-non-charging position,
- a primary ram reciprocable relative to the first path for driving meat charged thereinto from the hopper along the first path in outboard direction,
- means releasably interconnecting the primary ram and hopper for unison movement between meat-charging and meat-non-charging positions,
- primary cam means for releasing the primary ram-hopper interconnection upon entry into the meat-non-charging position and allowing separate primary ram movement relative to the hopper along the first path,
- first cutting means for cutting a slab from the meat at the meat-non-charging position and including a pair of horizontally-disposed contra-rotative cutters having their vertical axes spaced apart a distance less than the sum of their respective radii,
- second cutting means for cutting the slabs into strips as the primary ram drives the slab along the first path outboard of the meat-non-charging position,
- a tertiary ram for pushing the strips along the third path upon charge thereinto from the first path,
- the third path being disposed in a plane below the plane of the first path for the droppage of the strips upon transfer from first to third paths,
- tertiary cam means for driving the tertiary ram in inboard direction for the facilitation of transfer of the strips from first to third paths,
- third cutting means for cutting the strips into cubes as the tertiary ram drives the strips along the third path in outboard direction.

2. In the improvement of claim 1, with the overlapped cutters of the first cutting means each incorporating an outboard long peripheral bevel and an inboard short peripheral bevel for allowing a vertical space between the two peripheries with each cutter defining a cutting zone in the path of the moving work and with the cutting planes being in parallel disposition as to each other and the path of the moving meat.

* * * * *